United States Patent
Bacquet et al.

(10) Patent No.: US 11,362,526 B2
(45) Date of Patent: Jun. 14, 2022

(54) BATTERY PACK

(71) Applicant: Commissariat à l'Énergie Atomique et aux Énergies Alternatives, Paris (FR)

(72) Inventors: Sylvain Bacquet, Chasselay (FR); Eric Fernandez, Saint Paul de Varces (FR); Léandro Cassarino, Talence (FR); Ghislain Despesse, Voreppe (FR); Yan Lopez, Renage (FR); Rémy Thomas, Echirolles (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 15 days.

(21) Appl. No.: 16/958,129

(22) PCT Filed: Dec. 24, 2018

(86) PCT No.: PCT/FR2018/053543
§ 371 (c)(1),
(2) Date: Jun. 25, 2020

(87) PCT Pub. No.: WO2019/129991
PCT Pub. Date: Jul. 4, 2019

(65) Prior Publication Data
US 2020/0343742 A1  Oct. 29, 2020

(30) Foreign Application Priority Data

Dec. 27, 2017 (FR) ..................................... 1763249

(51) Int. Cl.
*H02J 7/00* (2006.01)
*H01M 10/42* (2006.01)
(Continued)

(52) U.S. Cl.
CPC ......... *H02J 7/0024* (2013.01); *H01M 10/425* (2013.01); *H01M 10/4207* (2013.01);
(Continued)

(58) Field of Classification Search
CPC .. H02J 7/0024; H02J 7/0068; H01M 10/4207; H01M 2010/4278;
(Continued)

(56) References Cited

U.S. PATENT DOCUMENTS

| 5,218,284 A * | 6/1993 | Burns et al. .............. H02J 7/34 320/112 |
| 5,498,950 A * | 3/1996 | Ouwerkerk ............. B60L 58/21 320/119 |

(Continued)

OTHER PUBLICATIONS

International Search Report and Written Opinion for International Application No. PCT/FR2018/053543, dated Mar. 26, 2019.
(Continued)

*Primary Examiner* — Sun J Lin
(74) *Attorney, Agent, or Firm* — Wolf, Greenfield & Sacks, P.C.

(57) ABSTRACT

A method of controlling a battery including a first control circuit and a plurality of modules arranged in series between a first terminal and a second terminal, each module of the plurality of modules including electric cells and switches coupling the electric cells and a second switch control circuit, the battery further including at least one first data transmission bus coupling the first control circuit to each second control circuit. The first control circuit includes a memory-having, for each electric cell, an identifier of said each electric cells and a priority level for connection of said each electric cell with other electric cells among priority levels stored therein.

7 Claims, 2 Drawing Sheets

(51) Int. Cl.
*H01M 10/44* (2006.01)
*H01M 10/48* (2006.01)

(52) U.S. Cl.
CPC ....... *H01M 10/441* (2013.01); *H01M 10/482* (2013.01); *H02J 7/0068* (2013.01); *H01M 2010/4271* (2013.01); *H01M 2010/4278* (2013.01)

(58) Field of Classification Search
CPC ............ H01M 10/482; H01M 10/425; H01M 2010/4271; H01M 10/441
USPC ....................................................... 320/117
See application file for complete search history.

(56) References Cited

U.S. PATENT DOCUMENTS

| | | | |
|---|---|---|---|
| 5,539,297 A * | 7/1996 | Fiebig | H02J 7/0024 320/126 |
| 5,656,915 A | 8/1997 | Eaves | |
| 2014/0077595 A1 | 3/2014 | Kakuya et al. | |

OTHER PUBLICATIONS

International Preliminary Report on Patentability for International Application No. PCT/FR2018/053543, dated Jul. 9, 2020.

\* cited by examiner

BATTERY PACK

This application is a national stage filing under 35 U.S.C. § 371 of International Patent Application Serial No. PCT/FR2018/053543, filed Dec. 24, 2018, which claims priority to French patent application FR17/63249, filed Dec. 27, 2017. The content of these applications are incorporated herein by reference in their entireties.

BACKGROUND

The present invention concerns a battery of electric cells or accumulators, also called pack battery.

DISCUSSION OF THE RELATED ART

It is known to form a battery comprising a plurality of stages or modules, in each of which accumulators, also called cells, may be connected in series or in parallel by controllable switches. Such a battery is capable of delivering a voltage having a waveform capable of varying over time by varying the connection of the cells over time via the turning on or the turning off of the switches.

FIG. 1 shows an example of such a battery 5. Battery 5 comprises N modules $E_1$ to $E_N$. Number N is an integer that may be in the range from 1 to 50. Each module comprises a positive terminal B+ and a negative terminal B− and a plurality of cells, not shown, capable of being connected to one another in series and/or in parallel via switches, not shown, between terminals B+ and B−. Modules $E_1$ to $E_N$ may be series-connected between a first terminal Neutral of battery 5 and a second terminal Phase of battery 5. An example of such a battery is described in patent application WO 2012/117110.

Battery 5 comprises a circuit BMS for controlling modules $E_1$ to $E_N$, called master control circuit hereafter. Master control circuit BMS may exchange data with each module $E_1$ to $E_N$ via a bidirectional data transmission BUS. Each module $E_1$ to $E_N$ comprises a circuit capable of controlling the switches of the module based on the control signals supplied by master control circuit BMS. This control circuit is called slave control circuit hereafter. Each module may further comprise sensors, not shown, for example, sensors of the voltage across each cell of the module, sensors of the current supplied by each cell of the module, and/or sensors of the temperature of each cell of the module. The slave control circuit of each module $E_1$ to $E_N$ is capable of transmitting to master control circuit BMS data representative of the voltage, current, and/or temperature measurements over data transmission bus BUS.

Master control circuit BMS may comprise a sensor of the voltage between the phase and neutral terminals as well as a general current sensor and a temperature sensor. Master control circuit BMS is capable of receiving a set point value C and of selecting the cells to be connected or disconnected for each module in order to comply with the set point value. Set point value C may be a voltage or current set point value, the cells to be connected or disconnected for each module then being selected to obtain the desired voltage and/or current between terminals Phase and Neutral of battery 5. As a variant, set point value C may be a set point value for a number of cells to be connected in series and/or in parallel between terminals Phase and Neutral of battery 5, the cells to be connected or to be disconnected for each module then being selected to obtain the number of cells connected in series and/or in parallel between terminals Phase and Neutral of battery 5 requested by the set point value. Master control circuit BMS then delivers control signals to the modules via data transmission bus BUS, based on which the slave control circuit of each module connects or disconnects the cells according to the desired configuration.

It is desirable to perform the selection of the cells to be connected/disconnected by ensuring that each cell operates in its optimal operating range according to the voltage, current, and temperature measurements supplied by the modules. In particular, it is desirable to perform a balancing of the cells, that is, for the cell selection to be performed so that the differences between the states of charge of the cells are permanently as small as possible. It is further desirable for the cell selection to take into account a possible failure of a cell so as to, for example, exclude this cell from the selection.

To perform the balancing function, master control circuit BMS may determine a classification of the cells according to priority levels, the cells holding the highest priority in the classification being those which should be selected first. The priority classification is capable of evolving during the battery operation, particularly due to the variation of the states of charge of the cells or due to the failure of a cell.

It is desirable for master control circuit BMS to take into account the priority classification during the determination of the cell selection and in particular to take into account the time variation of the priority classification.

For certain applications, the set point value received by management circuit BMS may vary rapidly so that it may be difficult for master control circuit BMS to select the cells to be connected/disconnected to follow the set point while taking into account a modification in the priority classification.

SUMMARY

Thus, an object of an embodiment is to provide a battery which overcomes at least some of the disadvantages of the previously-described batteries.

Another object of an embodiment is for the transmission of the control signals from the master control circuit of the battery to the slave control circuits of the modules in order to follow the set point not to be disturbed by the modification of the priority classification.

Thus, an embodiment provides a method of controlling a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells together and to the third and fourth terminals of the module and a second switch control circuit, the battery further comprising at least one first data transmission bus coupling the first control circuit to each second control circuit, the first control circuit comprising a memory having, for each electric cell, an identifier of the electric cell and a priority level for the connection of the electric cell among priority levels, stored therein. The method comprises the successive steps of:

a) reception by the first control circuit of a new set point value;

b) transmission, by the first control circuit to the second control circuits, of first control signals for the connection or the disconnection of at least one of the electric cells of the modules to follow said set point value; and c) transmission, by the first control circuit to the second control circuits, of second control signals for the connection of one of the electric cells and the disconnection of another electric cell among the electric cells.

According to an embodiment, the set point value is selected from the group comprising a set point for the delivery of a voltage between the first and second terminals, a set point for the delivery of a current to the first terminal or a set point for the number of electric cells.

According to an embodiment, the memory rows are arranged by increasing ranks and step c) comprises the successive steps of:
   d) exchange of the first and second memory rows if the priority level of the electric cell at the first row is greater than the rank of the first row; and
   e) transmission, by the first control circuit to the second control circuits, of the second control signals for the connection of the electric cell having the identifier at the second row before the exchange and for the disconnection of the electric cell having the identifier at the first row before the exchange in the case where the electric cell having the identifier at the second row before the exchange is disconnected and the electric cell having the identifier at the first row before the exchange is connected.

According to an embodiment, the first control circuit uses a first pointer designating a third row in the memory and, at step a), the control circuit modifies the pointer to designate a fourth row in the memory, the number of rows between the third row and the fourth row, counting the fourth row, being equal to the number of cells to be connected or disconnected to follow the set point.

According to an embodiment, the first control circuit uses a second pointer designating a fifth row in the memory and the first control circuit modifies the second pointer to designate a sixth row in the memory adjacent to the fifth row when the priority level of the electric cell at the fifth row is equal to the rank of the fifth row.

According to an embodiment, steps a), b), and c) are cyclically repeated, steps a) and b) being absent at least for one cycle when the set point value does not vary at said cycle.

An embodiment also provides a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells together and to the third and fourth terminals of the module and a second switch control circuit, the battery further comprising at least one first data transmission bus coupling the first control circuit to each second control circuit, the first control circuit comprising a memory having, for each electric cell, an identifier of the electric cell and a priority level for the connection of the electric cell among priority levels, stored therein. The first control circuit is capable of:
   a) receiving a new set point for the delivery of a voltage and/or of a current between the first and second terminals;
   b) transmitting to the second control circuits first control signals for the connection or the disconnection of at least one of the electric cells of the modules to follow said set point; and
   c) transmitting to the second control circuits second control signals for the connection of one of the electric cells and the disconnection of another electric cell among the electric cells.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
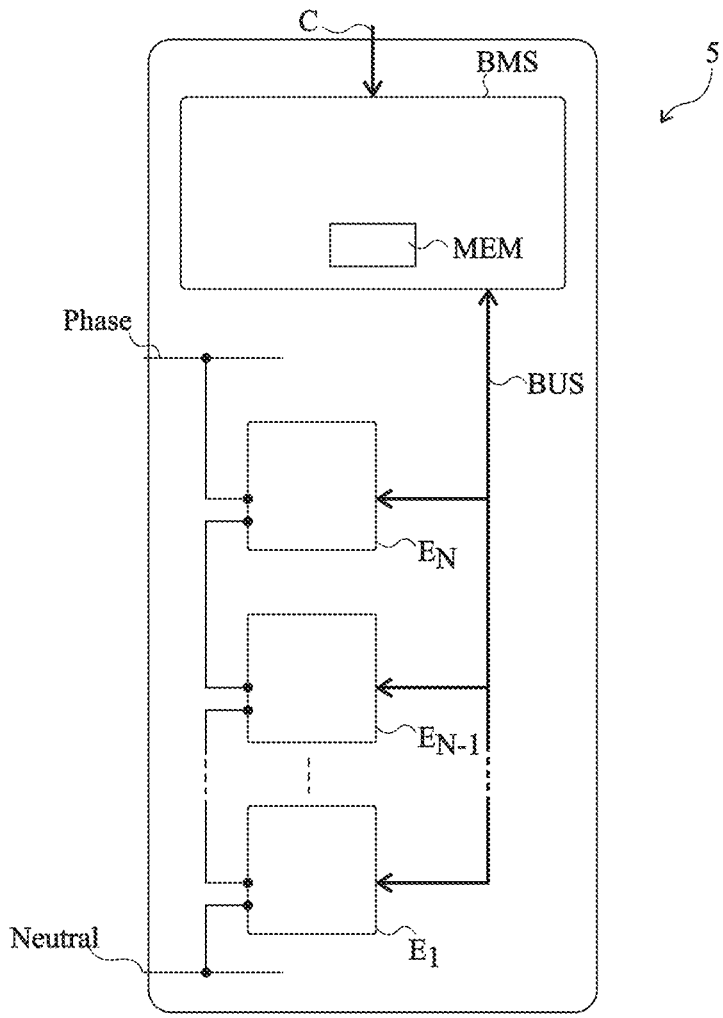
FIG. 1, previously described, partially and schematically shows an example of a cell battery.

Like features have been designated by like references in the various figures. For the sake of clarity, only the elements that are useful for an understanding of the embodiments described herein have been illustrated and described in detail. In particular, the conventional functions carried out by a master control circuit of a cell battery such as the cell balancing are well known by those skilled in the art and are not described in further detail hereafter. In the following description, the expressions "substantially", "about", "approximately", and "in the order of" mean "within 10%", preferably within 5%.

An embodiment of a method of controlling systems with switched cells will be described in the case of a switched cell battery for which the cells correspond to switched cells. However, the present embodiments apply to any type of system with switched cells capable of delivering a variable voltage to a load. Each cell of the system with switched cells may correspond to an electric charge storage element or to an electric generator. An example of an electric charge storage element for example is an electric cell or a capacitor. An example of an electric generator is for example a fuel cell, a zinc-air cell, a photovoltaic cell, or a power recovery system, particularly a small wind power plant or a mini-turbine. The system witch switched cells may comprise electric charge storage elements only, electric generators only, or both electric charge storage elements and electric generators. When the system with switched cells comprises electric generators only, the use is theoretically in discharge mode only. However, in case of a reactive power, for brief passages through a negative power at each period, the inertia of the generator may be sufficient to smooth the power, for example, due to the rotation inertia and to the stray capacitances. Further, each generator may be connected in parallel to a resistive element, to accept negative powers, by dissipating this power. In operation, the system is intended to be coupled to a device which absorbs or supplies power according to the envisaged application. As an example, this device corresponds to an electric machine, for example, to an electric motor, or to the electric distribution network.

Master control circuit BMS may correspond to a dedicated circuit and/or may comprise a processor, for example, a microprocessor or a microcontroller, capable of executing instructions of a computer program stored in the memory. Master control circuit BMS particularly comprises a data storage memory MEM.

According to an embodiment, the master control circuit uses a selection table to select a cell and cells when cell connection/disconnection operations are to be carried out. According to an embodiment, master control circuit BMS transmits first control signals corresponding to orders of connection/disconnection of the cells to the slave control circuit to follow the set point and transmits second control signals corresponding to orders of connection/disconnection of the cells to the slave control circuits to follow a modification of the selection table due to the priority classification change.

According to an embodiment, the taking into account of the modifications of the priority classification is performed progressively in the selection table. At each step of update of the selection table, only a portion of the selection table is processed by master control circuit BMS. Preferably, at each step of update of the selection table, only one row of the selection table if processed by master control circuit BMS. According to an embodiment, before each step of update of the selection table, the control circuit verifies whether a new set point value has been received so that the transmission of the first control signals is performed as a priority over the transmission of the second control signals.

Figure 2:
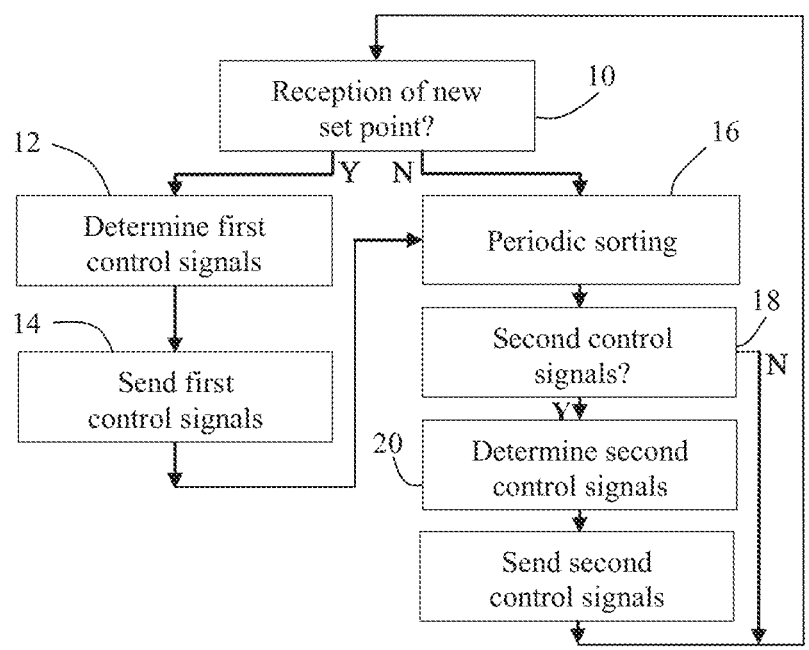
FIG. 2 is a block diagram illustrating a method of connection/disconnection of the cells of a battery.

FIG. 2 is a block diagram illustrating a method of cell connection/disconnection capable of being implemented by the battery 5 shown in FIG. 1.

At step 10, master control circuit BMS determines whether a new set point value C has been received. If a new set point value C has been received, the method carries on at step 12.

At step 12, control circuit BMS determines first control signals to follow the new set point. The method carries on at step 14.

At step 14, the first control signals are transmitted by master control circuit BMS to the slave control circuits of stages $E_1$ to $E_N$ over data transmission bus BUS. The method carries on at step 16.

If, at step 10, a new set point value C has not been received, the method carries on at step 16.

As a variation, step 10 may be absent and steps 12 and 14 may be executed at each cycle. When set point value C does not vary, the first control signals are however determined at step 12 to follow the unchanged value of set point value C and the first control signals are transmitted at step 14 by master control circuit BMS to the slave control circuits of stages $E_1$ to $E_N$ over data transmission bus BUS.

At step 16, master control circuit BMS performs a partial update of the selection table as described in further detail hereafter. The method carries on at step 18.

At step 18, master control circuit BMS determines whether step 16 of update of the selection table requires the transmission of the second connection/disconnection control signals to the slave control circuits of stages $E_1$ to $E_N$. If step 16 of partial update of the selection table does not require the transmission of the second connection/disconnection control signals, the method carries on at step 10. If step 16 of partial update of the selection table requires the transmission of the second connection/disconnection control signals, the method carries on at step 20.

At step 20, control circuit BMS determines second control signals to follow the update of the selection table. The method carries on at step 22.

At step 22, second data are transmitted by master control circuit BMS to the slave control circuits of stages $E_1$ to $E_N$ over data transmission bus BUS.

Figure 3:
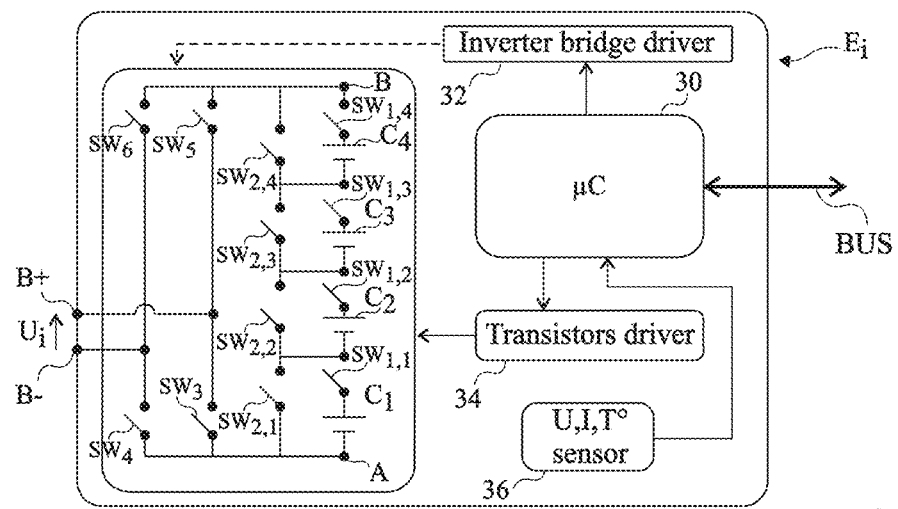
FIG. 3 partially and schematically shows an embodiment of a module of the battery of FIG. 1.

FIG. 3 shows an embodiment of module $E_i$, where i varies from 1 to N.

According to the present embodiment, module $E_i$ is capable of delivering a voltage $U_i$ between positive terminal B+ and negative terminal B—. Module $E_i$ comprises cells $C_1$ to $C_M$, where M is an integer in the range from 2 to 10, preferably from 2 to 5, four cells $C_1$, $C_2$, $C_3$, and $C_4$ being shown as an example in FIG. 3. Cells $C_1$ to $C_M$ are coupled together and to terminals B+ and B− by switches. In the present embodiment, for each cell $C_k$, k being an integer varying from 1 to M, module $E_i$ comprises a first switch $SW_{1,k}$ in series with cell $C_k$ and a second switch $SW_{2,k}$ in parallel with the assembly comprising cell $C_k$ and switch $SW_{1,k}$. The M assemblies comprising cell $C_k$ and first switch $SW_{1,k}$ are arranged in series between a node A and a node B. The control of switches $SW_{1,k}$ and $SW_{2,k}$, with k varying from 1 to M, enables to place in series between nodes A and B from 1 to M cells among the M cells $C_1$ to $C_M$. In the present embodiment, module $E_i$ further comprises an inverter bridge, also called H bridge, between nodes A and B and terminals B+ and B−, which enables to apply the voltage present between nodes A and B between terminals B+ and B− in both directions. According to an embodiment, the inverter bridge comprises a switch $SW_3$ coupling node A to terminal B+, a switch $SW_4$ coupling node A to terminal B−, a switch $SW_5$ coupling node B to terminal B+, and a switch $SW_6$ coupling node B to terminal B−. As an example, each switch $SW_{1,k}$ and $SW_{2,k}$, with k varying from 1 to M, $SW_3$, $SW_4$, $SW_5$, and $SW_6$ may correspond to an insulated field-effect transistor, also called MOS transistor, particularly a MOS power transistor, for example, an N-channel MOS transistor.

Each module $E_i$ further comprises slave control circuit 30 (µC), capable of exchanging and of receiving data transmitted by master control circuit BMS over data transmission bus BUS. Slave control circuit 30 may correspond to a dedicated circuit or may comprise a processor, for example, a microprocessor or a microcontroller, capable of executing instructions of a computer program stored in the memory.

Each module $E_i$ further comprises a driver circuit 32 (Inverter bridge driver) coupled to switches $SW_3$, $SW_4$, $SW_5$, and $SW_6$ of the inverter bridge and a driver circuit 34 (Transistors driver) coupled to switches $SW_{1,k}$ and $SW_{2,k}$, with k varying from 1 to M. Each driver circuit 32, 34 is capable of converting the control signals delivered by slave control circuit 30 into signals capable of controlling the switches.

Each module $E_i$ further comprises sensors 36 (U, I, T° sensor) coupled to slave control circuit 30. Module $E_i$ may comprise, for each cell $C_k$, a temperature sensor capable of measuring the temperature of cell $C_k$. Module $E_i$ may further comprise, for each cell $C_k$, a voltage sensor capable of measuring the voltage across cell $C_k$. Module $E_i$ may further comprise a current sensor capable of measuring the current flowing at node A or at node B. The slave control circuit 30 of each module $E_i$ is capable of transmitting third data to master control circuit BMS over data transmission bus BUS representative of the measurements performed by the sensors 30 of module $E_i$. The number and the type of sensors particularly depend on the arrangement of the cells of module $E_i$. In the cell arrangement shown in FIG. 3, a single sensor of the current flowing at node A or at node B may be provided.

In the embodiment of a battery module $E_i$ illustrated in FIG. 3, an order of connection of a cell $C_k$ of a module $E_i$ means that cell $C_k$ should be series-connected between the nodes A and B of module $E_i$, which is obtained by turning on switch $SW_{1,k}$ and by turning off switch $SW_{2,k}$, and an order of disconnection of a cell $C_k$ of a module $E_i$ means that cell $C_k$ should not be series-connected between the nodes A and B of module $E_i$, which is obtained by turning off switch $SW_{1,k}$ and by turning on $SW_{2,k}$. However, for a different arrangement of the cells $C_k$ of module $E_i$ where cells $C_k$ may be arranged in series or in parallel between nodes A and B, an order of connection of cells $C_k$ further specifies in which configuration, series or parallel, cell $C_k$ is placed with respect to the other cells of module $E_i$.

According to an embodiment, the selection table is stored in memory MEM of master control circuit BMS in the form of a table, each row in the table for example corresponding to a row of memory MEM. For a battery comprising N cells, the selection table comprises N rows. In the examples of selection tables described hereafter, N is equal to 160. The selection table comprises a first column, called "Cell no." hereafter, having identifiers of the battery cells stored therein. As an example, for a battery comprising N cells, the cell identifiers range from 1 to N. The selection table comprises a second column, called "Priority" having the priority levels of the cells stored therein. As an example, for a battery comprising N cells, the priority levels of the cells range from 1 to N, priority level "1" being the highest and priority level "N" being the lowest. Master control circuit BMS uses first and second pointers associated with the selection table. The first pointer is called "set point following pointer" and the second pointer is called "update pointer". These pointers each designate one of the rows of the selection table. The set point following pointer is representative of the number of cells to be connected to follow set point value C. When the set point following pointer designates row P of the selection table, where P varies from 1 to N, this means that the cells corresponding to rows 1 to P of the selection table should be connected. The update pointer is representative of the progress of the update of the selection table to take into account changes of the cell priority levels. When the set point following pointer designates row Q of the selection table, where Q varies from 1 to N, this means that the update of rows 1 to Q-1 of the selection table has been performed and that the priority levels of the cells at rows 1 to Q-1 are respectively equal from 1 to Q-1.

For illustration purposes, the selection table is shown hereafter as a table where the first two columns correspond to columns "Cell no." and "Priority" of the selection table. For illustration purposes, a third column called "Connection" where, for each row of the selection table, symbol "o" indicates that the cell of the row is to be connected and symbol "n" indicates that the cell of the row is to be disconnected, has been added to the table. A fourth column, called "Set point following pointer", where a cross "x" indicates the row of the selection table designated by the set point following pointer, has further been added to the table. A fifth column, called "Update pointer" where a cross "x" indicates the row of the selection table designated by the update pointer has further been added to the table. A sixth column called "Connection order" where the numbers of the rows of the selection table, which vary from 1 to N, as indicated, has further been added to the table. When a complete update of the selection table is performed, columns "Priority" and "Connection order" are identical.

An embodiment of a method of use of the selection table during the implementation of the method previously described in relation with FIG. 2 will now be described in the case of a reception of a new set point value C by master control circuit BMS.

As an example, it is assumed that, before the reception of the new set point value C, the selection table may be represented by the following table I:

TABLE I

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 156 | 4 | n | | | 8 |
| ... | ... | n | | | ... |
| 5 | 5 | n | | | 5 |
| 4 | 0 | o | | x | 4 |
| 3 | 2 | o | | | 3 |
| 159 | 3 | o | | | 2 |
| 1 | 8 | o | | x | 1 |

In table I, the set point following pointer designates row 4 of the selection table, which means that the cells designated by the rows numbered from 1 to 4 of the selection table are connected, and the update pointer designates row no. 1 of the selection table, which means that an update of the selection table should be performed for the rows numbered from 1 to N.

As an example, at step 10, the master control circuit receives a set point value for the connection of an additional cell. At step 12, master control circuit BMS displaces the set point following pointer by one rank to designate row no. 5, as shown in table II hereafter. Master control circuit BMS then determines first control signals to connect cell no. 5, which are sent to the slave control circuits at step 14.

TABLE II

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 156 | 4 | n | | | 8 |
| ... | ... | n | | | ... |
| 5 | 5 | n | x | | 5 |
| 4 | 0 | o | | | 4 |
| 3 | 2 | o | | | 3 |
| 159 | 3 | o | | | 2 |
| 1 | 8 | o | | x | 1 |

At step 16, master control circuit BMS determines that the priority level of the cell designated by the update pointer is equal to 8 while its connection order is equal to 1. Master control circuit BMS displaces this cell to the connection order no. 8 corresponding to its priority level and displaces the cell which was at connection order no. 8 to connection order no. 1. This amounts to exchanging in the selection table rows no. 1 and no. 8, which results in table III hereafter.

TABLE III

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 1 | 8 | o | | | 8 |
| ... | ... | n | | | ... |
| 5 | 5 | o | | x | 5 |
| 4 | 0 | o | | | 4 |

TABLE III-continued

| Cell No. | Priority | Connection | Set point following pointer | Update pointer | Connection order |
|---|---|---|---|---|---|
| 3 | 2 | o | | | 3 |
| 159 | 3 | o | | | 2 |
| 156 | 4 | n | | x | 1 |

The performed permutation has introduced a connection "hole" for the set point following pointer. There should be no connected cells in the rows of the selection table having a higher rank than the row designated by the set point following pointer and there should be no unconnected cells in the rows of the selection table having a lower rank than the row designated by the set point following pointer. Master control circuit BMS then determines at step 20 second control signals to connect cell no. 156 and to disconnect cell no. 1, which results in table IV hereafter. The second control signals are sent to the slave control circuits at step 22 and the method carries on at step 10.

TABLE IV

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 1 | 8 | n | | | 8 |
| ... | ... | n | | | ... |
| 5 | 5 | o | x | | 5 |
| 4 | 0 | o | | | 4 |
| 3 | 2 | o | | | 3 |
| 159 | 3 | o | | | 2 |
| 156 | 4 | o | | x | 1 |

Advantageously, master control circuit BMS processes a set point value before updating the selection table. Thereby, an update is performed with the most up-to-date state of the system.

To simplify the selection table update explanations, it can be imagined that the set point no longer changes, and thus no longer causes variations of the set point following pointer or of the connection states.

At the next step 16, master control circuit BMS determines that the priority level of the cell designated by the update pointer is equal to 4 while its connection order is equal to 1. Master control circuit BMS displaces this cell to the connection order no. 4 corresponding to its priority level and displaces the cell which was at connection order no. 4 to connection order no. 1. This amounts to exchanging in the selection table rows no. 1 and no. 4, which results in table V hereafter. This permutation generates no hole in the connections, both cells no. 4 and no. 156 being connected. There is no second control signal to be sent and the method returns to step 10.

TABLE V

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |

TABLE V-continued

| Cell No. | Priority | Connection | Set point following pointer | Update pointer | Connection order |
|---|---|---|---|---|---|
| ... | ... | n | | | ... |
| 1 | 8 | n | | | 8 |
| ... | ... | n | | | ... |
| 5 | 5 | o | x | | 5 |
| 156 | 4 | o | | | 4 |
| 3 | 2 | o | | | 3 |
| 159 | 3 | o | | | 2 |
| 4 | 1 | o | | x | 1 |

At the next step 16, master control circuit BMS determines that the priority level of the cell designated by the update pointer is equal to 1 and that its connection order is equal to 1. The cell is thus properly placed in the selection table. The update pointer is then incremented and designates row no. 2 of the selection table, as shown in table VI hereafter. There is no second control signal to be sent and the method returns to step 10.

TABLE VI

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 1 | 8 | n | | | 8 |
| ... | ... | n | | | ... |
| 5 | 5 | o | x | | 5 |
| 156 | 4 | o | | | 4 |
| 3 | 2 | o | | | 3 |
| 159 | 3 | o | | x | 2 |
| 4 | 1 | o | | | 1 |

At the next cycle, the same operations are continued, with this time an update pointer which designates row no. 2 of the selection table.

According to an embodiment, when the update of the selection table is totally performed, which corresponds to an update pointer equal to N, master control circuit BMS may displace the update pointer in the selection table, without other actions, for example, by incrementing the update pointer so that it successively designates rows 1 to N of the selection table, until an inconsistency between the connection order and the priority level of the corresponding cell is detected.

An advantage of the previously-described embodiment is the rapidity of the response of battery 5 when a modification of a set point value occurs.

According to an embodiment of the method of data transmission over bus BUS, a first or a second control signal transmitted by master control circuit BMS is addressed to the slave control circuit 12 of a single module $E_i$. The slave control circuit 12 of each module $E_i$ is then capable of determining whether the control signal that it receives is addressed thereto. If this is true, slave control circuit 12 controls driver circuits 14 and 16 to apply the orders of connection/disconnection requested by master control circuit BMS. As an example, the control signals are transmitted in the form of frames, each frame comprising a header containing the address of the designated module $E_i$ followed by bytes relative to the control of the switches, and possibly followed by at least one control byte. An advantage of such an embodiment is that the reactivity of battery 5 on reception of a new set point C is optimal. Further, the switchings of the switches of modules $E_i$ are spread over time so that the generation of electromagnetic disturbances is decreased. Further, an efficient frame error control may be implemented.

According to another embodiment of the data transmission method, each frame transmitted by master control circuit BMS contains all the connection/disconnection orders for all the cells $C_k$ of all modules $E_i$. The slave control circuit 12 of each module $E_i$ is thus used for each frame sent by master control circuit BMS. The slave control circuit 12 of each module $E_i$ is capable of analyzing the frame and of extracting therefrom the orders of connection/disconnection of the switches belonging to module $E_i$.

Figure 4:
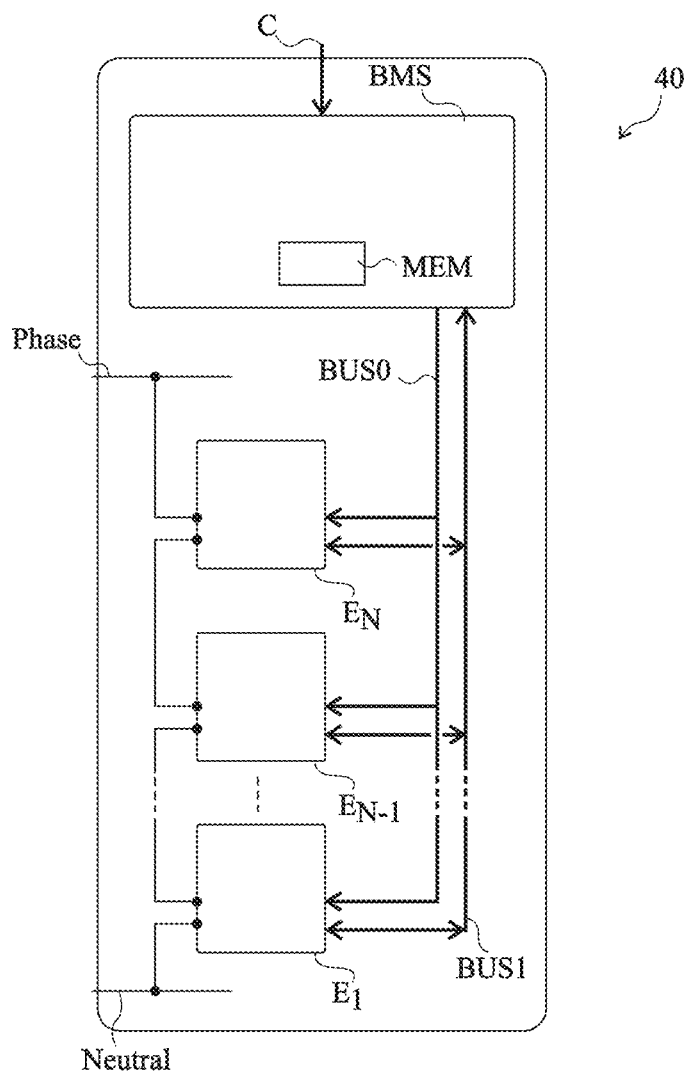
FIG. 4 partially and schematically shows an embodiment of a cell battery.

FIG. 4 shows an embodiment of a battery 40. Battery 40 comprises all the elements of battery 5 shown in FIG. 1, with the difference that data transmission bus BUS is replaced with two data transmission buses BUS0 and BUS1, which each couple master control circuit BMS to each module $E_1$ to $E_N$.

Data transmission bus BUS0 is a fast bus, that is, a bus over which data are transmitted at a rate greater than 3 megabits per second, preferably in the range from 5 megabits per second to 7 megabits per second. Data transmission bus BUS0 may be a unidirectional bus. As an example, bus BUS0 is a bus according to standard RS485 used in unidirectional mode.

Bus BUS1 is a slow bus, that is, a bus over which data are transmitted at a rate smaller than 3 megabits per second, preferably in the range from 0.5 megabit per second to 1 megabit per second. Bus BUS1 is a bidirectional bus. As an example, bus BUS1 is a CAN data bus, particularly according to ISO standard 11898, which advantageously integrates a communication arbitration management.

Fast bus BUS0 is used for the transmission of the first and second control signals supplied by master control circuit BMS to follow set point value C. Slow bus BUS1 is used for the exchange of all the other data between master control circuit BMS and each module $E_1$ to $E_N$.

Specific embodiments of the present invention have been described. Various alterations and modifications will occur to those skilled in the art. Although FIG. 3 shows an embodiment of arrangement of the cells and of the switches of a module $E_i$, it should be clear that the structure of each module $E_i$ may be different. In particular, the structure of each module $E_i$ may correspond to one of the structures described in patent application WO 2012/117110.

The invention claimed is:

1. A control method of controlling an electric system comprising a first control circuit and a plurality of modules arranged in series between a first terminal and a second terminal, each module of the plurality of modules comprising a third and a fourth terminal, at least one of the third terminal and the fourth terminal of each module being coupled to one of the third terminal and the fourth terminal of another module, each module comprising electric cells and switches coupling the electric cells together and to the third terminal and the fourth terminal of each said module and a second control circuit that controls the switches, the electric system further comprising at least one first data transmission bus coupling the first control circuit to each second control circuit, the first control circuit comprising a memory having, for each electric cell, an identifier of the electric cell and a priority level for connection of the electric cell among priority levels stored therein, the method comprising the following successive steps:

a) reception by the first control circuit of a set point value newly input to the first control circuit;
b) transmission, by the first control circuit to the second control circuits, of first control signals for connection or disconnection of at least one of the electric cells of the plurality of modules to follow said set point value; and
c) transmission, by the first control circuit to the second control circuits, of second control signals for connection of one of the electric cells and disconnection of another electric cell among the electric cells.

2. The control method according to claim 1, wherein the set point value is selected from a group comprising a set point for delivery of a voltage between the first terminal and the second terminal, a set point for delivery of a current at the first terminal, or a set point for a number of electric cells.

3. The control method according to claim 1, wherein rows of the memory are arranged by increasing ranks and wherein step c) comprises the following successive steps:

d) exchange of a first row and a second row of the memory if the priority level of the electric cell at the first row is greater than the rank of the first row; and
e) transmission, by the first control circuit to the second control circuits, of the second control signals for connection of the electric cell having the identifier at the second row before exchange and for disconnection of the electric cell having the identifier at the first row before the exchange in a case where the electric cell having the identifier at the second row before the exchange is disconnected and the electric cell having the identifier at the first row before the exchange is connected.

4. The control method according to claim 1, wherein the first control circuit uses a first pointer designating a third row in the memory and wherein, at step a), the first control circuit modifies the first pointer to designate a fourth row in the memory, a number of rows between the third row and the fourth row, counting the fourth row, being equal to a number of cells to be connected or disconnected to follow the set point value.

5. The control method according to claim 1, wherein the first control circuit uses a second pointer designating a fifth row in the memory and the first control circuit modifies the second pointer to designate a sixth row in the memory adjacent to the fifth row when the priority level of the electric cell at the fifth row is equal to the rank of the fifth row.

6. The control method according to claim 1, wherein steps a), be, and c) are repeated cyclically, steps a) and b) being absent at least for one cycle when the set point value does not vary at said cycle.

7. An electric system comprising a first control circuit and a plurality of modules arranged in series between a first terminal and a second terminal, each module of the plurality of modules comprising a third terminal and a fourth terminal, at least one of the third terminal and the fourth terminal of each module being coupled to one of the third terminal and the fourth terminal of another module or the plurality of modules, each module comprising electric cells and switches coupling the electric cells together and to the third terminal and the fourth terminal of said each module and a second control circuit that controls the switches, the electric system further comprising at least one first data transmission bus coupling the first control circuit to each second control circuit, the first control circuit comprising a memory having, for each electric cell, an identifier of the electric cell and a priority level for connection of the electric cell among priority levels stored therein, the first control circuit being capable of:
- a) receiving a new set point value for delivery of a voltage and/or of a current between the first terminal and the second terminal;
- b) transmitting to the second control circuits first control signals for connection or disconnection of at least one of the electric cells of the plurality of modules to follow said new set point value; and
- c) transmitting to the second control circuits second control signals for connection of one of the electric cells and disconnection of another electric cell among the electric cells.

* * * * *